(12) United States Patent
Tanigaki et al.

(10) Patent No.: US 6,503,289 B2
(45) Date of Patent: Jan. 7, 2003

(54) PROCESS FOR MANUFACTURING MOLTEN METAL IRON (75) Inventors: Yasuhiro Tanigaki, Osaka (JP); Akira Uragami, Shinagawa-ku (JP)

(73) Assignee: Midrex International B.V. Zurich Branch, Zurich (CH)

(*) Notice: Subject to any disclaimer, the term of this patent is extended or adjusted under 35 U.S.C. 154(b) by 0 days.

(21) Appl. No.: 09/820,610

(22) Filed: Mar. 30, 2001

(65) Prior Publication Data
US 2001/0025550 A1 Oct. 4, 2001

(30) Foreign Application Priority Data
Mar. 30, 2000 (JP) .................................... 2000-094765

(51) Int. Cl.[7] .............................................. C21B 11/10
(52) U.S. Cl. ........................... 75/10.63; 75/484; 75/500
(58) Field of Search ............................... 75/484, 10.63, 75/500

(56) References Cited

U.S. PATENT DOCUMENTS

| 1,885,381 A | 11/1932 | Simpson |
| 3,443,931 A | 5/1969 | Beggs et al. |
| 3,947,621 A | 3/1976 | Collin et al. |
| 4,701,214 A | 10/1987 | Kaneko et al. |
| 5,873,925 A | 2/1999 | Rinker et al. |
| 5,885,521 A | 3/1999 | Meissner et al. |
| 5,989,019 A | 11/1999 | Nishimura et al. |
| 6,036,744 A | 3/2000 | Negami et al. |
| 6,063,156 A | 5/2000 | Negami et al. |
| 6,126,718 A | 10/2000 | Sawa et al. |
| 6,129,777 A | 10/2000 | Fuji et al. |
| 6,149,709 A | 11/2000 | Uragami et al. |
| 6,152,983 A | 11/2000 | Kamijo et al. |
| 6,241,803 B1 | 6/2001 | Fuji |
| 6,251,161 B1 | 6/2001 | Tateishi et al. |

FOREIGN PATENT DOCUMENTS

| EP | 0 952 230 | 10/1999 |
| EP | 0 969 105 | 1/2000 |
| JP | 10-147806 | 6/1998 |
| JP | 11-29806 | 2/1999 |
| JP | 11-50165 | 2/1999 |
| JP | 11-335712 | 12/1999 |
| JP | 2000-45008 | 2/2000 |
| WO | WO 99/16913 | 4/1999 |

OTHER PUBLICATIONS

Nagami et al U.S. patent application Publication US 2001/0049980 A1 Dec. 13, 2001.*
Patent Abstracts of Japan, JP 11 217614, Aug. 10, 1999.

* cited by examiner

Primary Examiner—Melvyn Andrews
(74) Attorney, Agent, or Firm—Oblon, Spivak, McClelland, Maier & Neustadt, P.C.

(57) ABSTRACT

A process comprising: charging a raw material compacting substance containing a carbonaceous reducing agent and an iron oxide contained substance into a moving hearth type furnace; reducing the raw material compacting substance to a reducing ratio 30 to 80% within the reducing furnace to thereby form a shell formed of metal iron or forming a state that a shell formed of metal iron or metal iron are stretched around in a network fashion and a carbonaceous reducing agent remains in a clearance therebetween; agglomerating produced slag containing FeO therein; charging the compacting substance reduced into a melting furnace in a state maintaining a high temperature, and carrying out final reducing and melting to obtain molten meal iron.

8 Claims, 6 Drawing Sheets

PROCESS FOR MANUFACTURING MOLTEN METAL IRON

BACKGROUND OF THE INVENTION

1. (Field of the Invention)

The present invention relates to an improvement of the technique for heating and reducing iron oxide such as iron ore by a carbonaceous reducing agent such as coke to obtain molten metal iron, and relates to an improved process for efficiently reducing iron oxide into metal iron by simple processing, and effectively making the most of holding heat of metal iron to manufacture molten metal iron inexpensively and with excellent productivity.

2. (Description of the Related Art)

Many proposals have been heretofore made, in which a source of iron oxide such as iron ore and iron oxide is mixed with a carbonaceous reducing agent such as coke and coal to compact it into a pellet or a briquette, and the compacted substance is heated to thereby reduce iron oxide in the compacted substance to obtain metal iron.

For example, there is a process comprising: using raw materials of a pellet of fine powdery iron oxide having a solid carbonaceous material as a reducing agent internally, heating this in a rotary hearth type reducing furnace for pre-reduction, feeding the obtained pre-reduced substance from a reducing furnace to a refining furnace at a temperature of not less than 1000° C. for refinement, and further progressing reduction to manufacture molten metal iron. This process comprises compacting a mixture of raw materials including powdery iron oxide and solid carbonaceous material into a pellet-like substance or a lump-like substance, heating the substance for about 10 to 50 minutes at a relatively low temperature of from 1100 to 1350° C. after drying or without drying to progress reduction to about 50 to 90% of the reducing ratio, and thereafter carrying out refinement and final reduction. However, in this process, since the heating temperature at the time of reduction is low, it takes a long period of time for heating and reducing, and for realizing volume production, a large-scaled facility is necessary and in addition, the energy consumption quantity required for reduction is great.

There is a further process which comprises compacting iron oxide having a carbonaceous reducing agent into a granular or lump-like substance internally, heating and reducing the compacted substance while moving it in a horizontal direction on the moving hearth, producing and growing a metal iron shell to thereby progress reduction till iron oxide is not present therein, agglomerating produced slag within the shell of metal iron, discharging it from the moving hearth and further heating it to thereby melt the shell of metal iron, and separating it into molten slag and molten metal ion. According to this process, since heating and reducing are carried out at a high temperature of not less than 1300° C., the time required for reduction can be considerably reduced, but since reduction should be progressed till iron oxide is not substantially presented therein after the shell of metal iron has been formed, it requires a considerable time till reduction is terminated, and accordingly, the horizontal moving distance is long, the facility becomes large-scaled and consumption energy is great. Further, in this process, since energy required for heating reduction and energy required for final reduction and melting are unbalanced, heat energy is wasteful.

There is a process for manufacturing pig iron using compact comprising iron oxide and carbonaceous reducing agent in a partially-reduced state as raw material. The compact in a partially-reduced used in this process is compact of two layer structure comprising a shell which consisted mainly of metal iron and an inner nuclear which consisted mainly of metal iron, iron oxide and free carbon. The partially-reduced compact whose total iron content in mass % is not less than 70%, metal iron content is 20 to 50%, free carbon content is not less than 5%, and volume of compact is not less than 20 cm3 is used as raw material, which is charged into a shaft furnace and heated to thereby obtain molten metal iron. The partially-reduced compact has metal iron, free carbon and iron oxide mixed therein as described above. However, the free carbon quantity is 5 to 10% which is not enough for reduction of iron oxide remained in the partially-reduced state and carburizing necessary for efficient melting so that in the final carburizing and melting step which is a next step, carbon should be added separately. Further, in this process, the partially-reduced compact is molten and reduced in a blast furnace to manufacture pig iron, but it is necessary for enhancing the processing efficiency in the blast furnace to maintain gas permiability in the furnace at a high level, for which purpose, the raw material compact should have a large diameter (for securing the volume of not less than 20 cm3 in a spherical state, a diameter is not less than about 3.4 cm), manufacturing of a large-diameter pellet or briquette as described is considerably complicated so that not only exclusive-use lump forming equipment is necessary but also the yield is poor, lacking in flexibility of raw material processing.

SUMMARY OF THE INVENTION

It is an object of the present invention to provide a process comprising: in reducing a raw material compacting substance containing a carbonaceous reducing agent and an iron oxide contained substance to manufacture metal iron, efficiently progressing reduction without involving an excessive burden in pre-compacting of raw material to obtain a partially-reduced substance; progressing, in a short period of time and efficiently, further reduction and melting in a state of maintaining the temperature of the partially-reduced substance to enable production of molten iron of high purity with excellent productivity.

The subject matter of the manufacturing process according to the present invention comprises: charging a raw material compacting substance containing a carbonaceous reducing agent and an iron oxide contained substance into a moving hearth type reducing furnace; and reducing the raw material compacting substance to the reducing ratio 30 to 80% within the reducing furnace to thereby form a shell of metal iron; or forming, with metal iron stretched around in a network fashion, a state that the carbonaceous substance remains in a clearance therein, and agglomerating FeO contained produced slag therein, taking the reduced compacted substance (partially-reduced substance) in a state of maintaining a high temperature out of the reducing furnace to charge it into an arc heating type melting furnace or an iron bath furnace; and carrying out final reduction, carburizing and melting to obtain molten metal iron.

In embodying the above process, iron oxide remained in the raw material compacting substance reduced is further reduced within the melting furnace, and the carbonaceous reducing agent carburizes reduced iron produced. However, preferably, if a carbonaceous reducing agent of surplus by 3 to 6% mass % with respect to the theoretic equivalent amount necessary for reducing iron oxide is contained in the compacted substance when the raw material compacting substance is produced, heating and reducing is progressed fully without requiring additional charge of the carbonaceous reducing agent, and later carburizing can be progressed efficiently.

If an internal temperature of a reducing furnace in which reducing is carried out is controlled in the range of from 1350 to 1450° C., or the raw material compacting substance charged into the reducing furnace is further raised in temperature quickly to a temperature of not less than 800° C. within 2 minutes, reducing can be progressed efficiently in a short period of time. If the temperature is controlled in a manner as described above, the aforesaid reduction of the raw material compacting substance can be progressed in an extremely short period of time, say, 3 to 5 minutes. Further, for more positively obtaining the reduction rate enhancing effect caused by the temperature control as described, it is most effective to use pellet-like or briquette-like raw material compacting substance having a diameter of 3 to 25 mm.

DESCRIPTION OF THE PREFERRED EMBODIMENTS

In the present invention, there is employed a process for manufacturing molten metal iron, in which a rotary hearth type heating and reducing furnace is used as a moving hearth type heating and reducing furnace, a reducing ratio in a solid state is set to the range of 30 to 80%, and a partially-reduced substance produced at that time is supplied to a melting furnace in a high temperature state, and final reducing and melting are carried out to manufacture molten metal iron.

Figure 6:
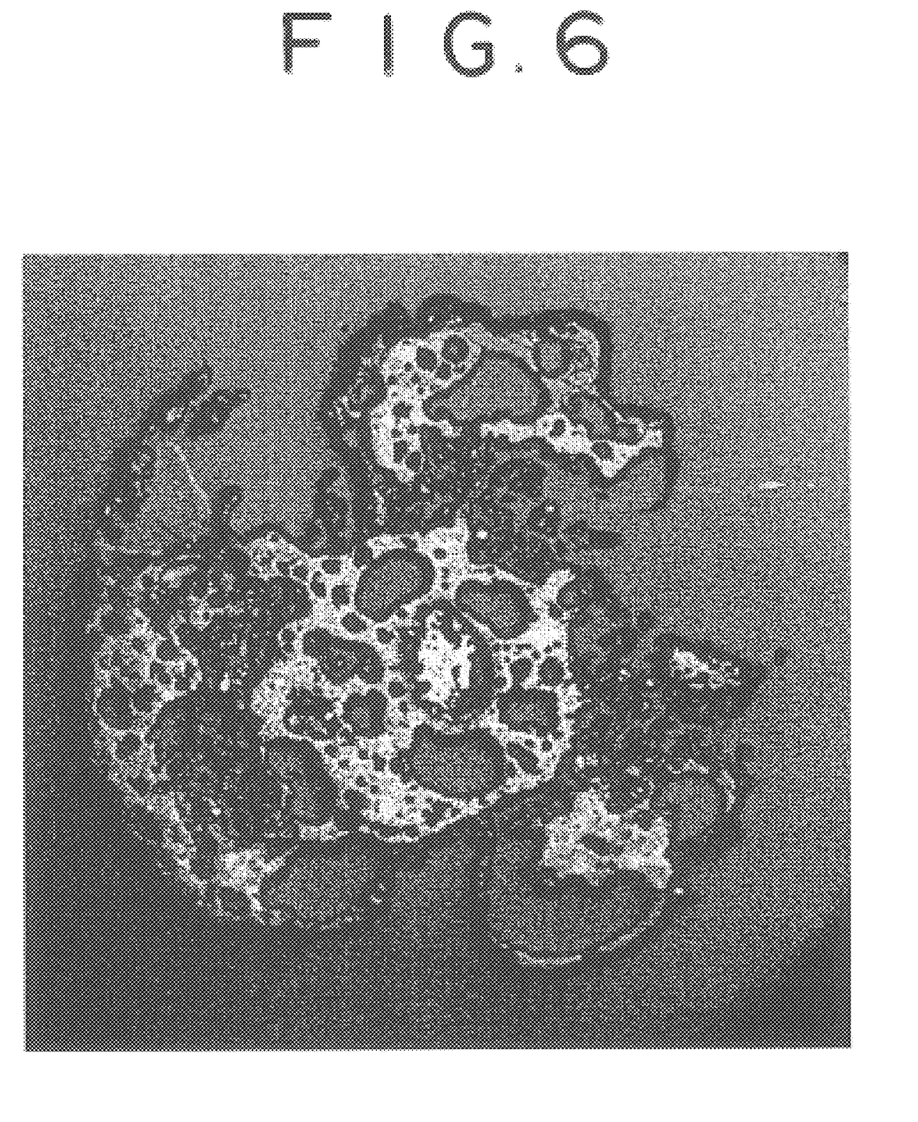
FIG. 6 is a photograph illustrating a partially-reduced substance in a state that metal iron is stretched around in a network fashion.

The partially-reduced substance termed herein is a bell-like partially-reduced substance having a construction in which slag produced internally of a shell of metal iron is agglomerated, or a partially-reduced substance in a state that metal iron is stretched around in a network fashion and a carbonaceous reducing agent remains in a clearance thereof (see FIG. 6 described later). If the partially-reduced substance is used as a melting raw material, since reducing and melting are progressed in a state that FeO in slag is confined within a shell of metal iron or within a cell of metal iron constituted in a network fashion, molten loss (penetration and erosion) of refractory in a processing furnace caused by FeO can be suppressed as less as possible particularly in the melting step; and as the case may be, since FeO some amount of which flows out is quickly reduced by the carbonaceous reducing agent remaining in the partially-reduced substance, molten loss of refractory in a processing furnace can be suppressed to the minimum limit.

The reducing ratio mentioned in the present invention is a value obtained by the following equation:

Reducing ratio=[oxygen amount removed in reducing course/oxygen in iron oxide contained in raw material compacting substance]* 100(%)

Figure 1:
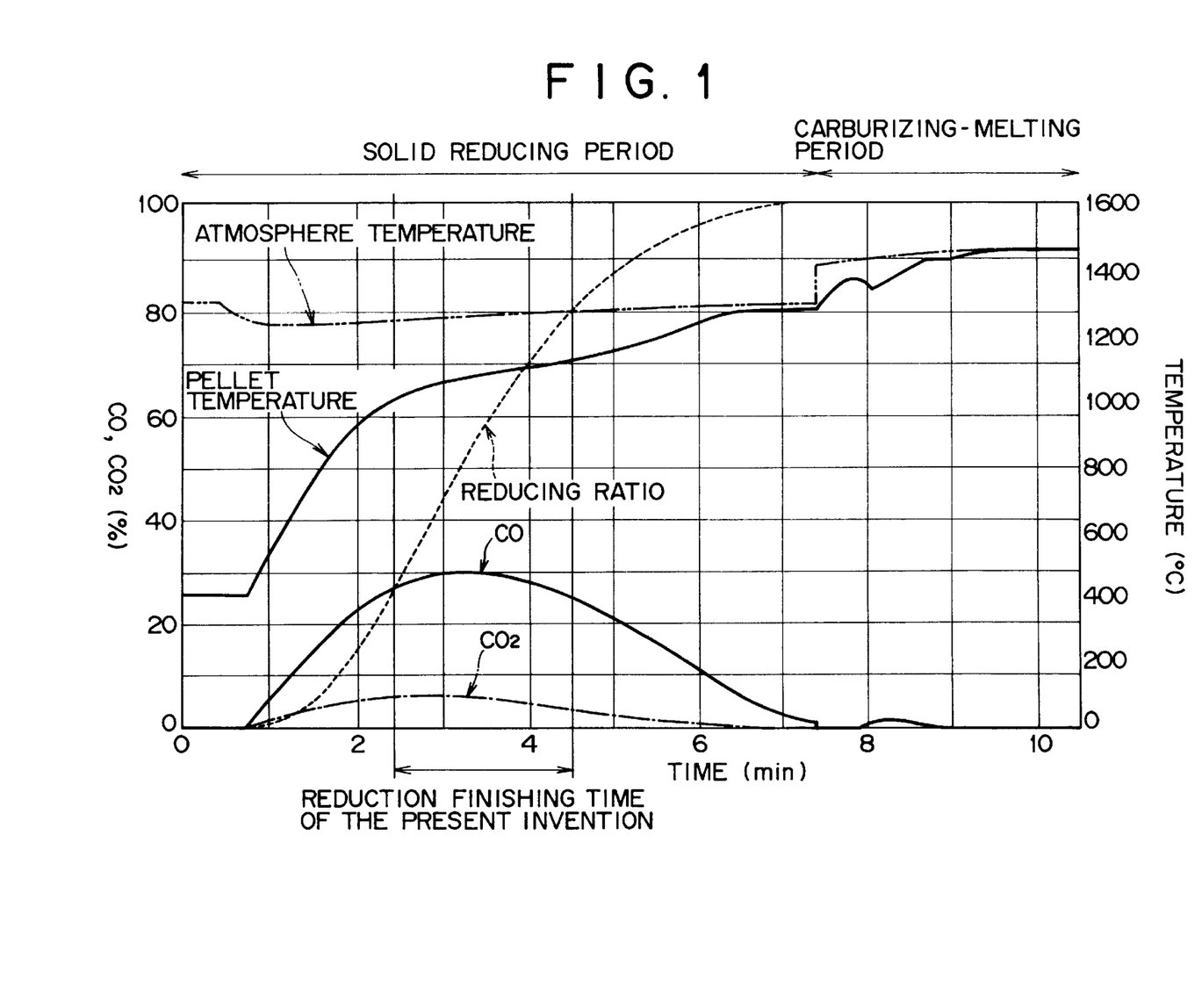
FIG. 1 is a view showing, when reducing and melting of a raw material compacting substance is carried out in a fundamental experiment, an ambient temperature, a temperature of raw material compacting substance, a reducing ratio, and a change of generation amounts of CO, CO2.

Next, the reason why the reducing ratio of the raw material compacting substance at the time of reduction is determined to the range of 30 to 80% will be clearly explained. FIG. 1 is a view showing the results obtained by the fundamental experiment. This experiment shows an internal temperature and an atmosphere temperature of a raw material pellet and a transition of a reducing ratio, and a change of quantities of CO gas and CO2 gases produced during that period when a raw material compacting substance (a pellet whose diameter is 16 to 19 mm) using iron ore as a source of iron oxide and coal as a carbonaceous reducing agent is charged into a furnace whose atmosphere temperature is controlled to about 1300° C., solid reducing is carried out till the reducing ratio (removal ratio of oxygen in iron oxide in the raw material compacting substance) reaches approximately 100%, the atmosphere temperature is further elevated to 1425° C. to further heat and melt reduced iron to produce molten metal iron.

As will be apparent from the figure, the reducing ratio of iron oxide in the raw material compacting substance rapidly raises with the passage of heating time, but reduction of iron oxide during that period materially depends on the reduction of iron oxide by the carbonaceous reducing agent contained in the raw material compacting substance and the reductive CO gas produced accordingly, and the reducing ratio raises rapidly as the generation amount of the CO gas increases. When an up curve of the reducing ratio reaches the maximum when the generation amount of the CO gas reaches the maximum value, and thereafter the up curve of the reducing ratio becomes dull with the reduction of the generation amount of the CO gas.

Such a phenomenon is contemplated to result from the fact that a shell of metal iron is formed on the surface layer of the raw material compacting substance by the solid reduction, or a shell layer of the construction in which metal iron is stretched around in a network fashion is formed, CO gas produced by the reaction between the carbonaceous reducing agent present therein and iron oxide are confined in the shell of metal, and the reducing ratio raises rapidly as an internal reducing potential raises rapidly. It is judged that when the reducing ratio reaches a certain level, the amount of iron oxide and carbonaceous reducing agent remained therein is reduced so that the generation amount of CO gas also reduces, as a result of which thereafter, the up speed of the reducing ratio becomes dull.

There can be assured that as will be understood from the figure, the circumstance that the reducing ratio is stabilized to indicate the high up speed so that the reducing ratio of the raw material compacting substance rapidly raises is in a region till the reducing ratio reaches 80%, and thereafter the up tendency of the reducing ratio becomes dull. From the tendency as described, the solid reduction is progressed efficiently in a short period of time with best efficiency when an internal reducing potential caused by the formation of the shell in a solid reducing period raises. Thereafter, the raising of the reducing ratio becomes dull with the reduction of the generation amount of CO gas. Therefore, even if the solid reducing is continued in that state, a rapid raising of the reducing ratio per unit time cannot be expected, which will be rather minus in shortening the reduction time.

From the foregoing, the present invention employs a process in which the procedure is stopped at the partially-reduced state till "reducing ratio 80%" at which the solid reduction progressed most efficiently, the obtained partially-reduced substance is charged into a melting furnace where high heating efficiency is obtained continuously, heating and reducing, and carburizing and melting of oxide remained in the partially-reduced state are progressed efficiently in a short period of time. By the employment of such a procedure as described, the total time required for further reduction from the solid reduction and carburizing and melting can be considerably shortened to enable considerable enhancement of productivity of molten metal iron.

The lower limit of the reducing ratio in the solid reducing period is determined to 30% because when the reducing ratio of the partially-reduced substance to be charged into a melting furnace such as an arc heating type melting furnace and an iron bath furnace is less than 30%, not only formation of the metal shell is insufficient but also a part of iron oxide in an non-reduced state is molten at the time of carburizing and melting and mixed into produced slag to cause the lined refractory of the processing furnace to result in a great molten loss. However, if the reducing ratio is progress to at least 30% in the solid reducing step, iron oxide in the non-reduced state assumes a state that it is held within the shell of metal iron formed in the solid reducing period or the network-like shell of metal iron whereby heat is received rapidly within the melting furnace and the reducing and carburizing progress quickly within the shell so that the outflow as molten iron oxide to the outside is suppressed and the molten loss of the lined refractory rarely occurs.

From the reasons as described above, in the present invention, the lower limit of the reducing ratio at the end of solid reducing period is determined to not less than 30%, but for more positively preventing molten loss of the lined refractory due to the outflow of molten iron oxide, preferably, the reducing ratio in the solid reducing period is raised to not less than 40%, more preferably, not less than 50%.

Further, for progressing the reducing ratio of the solid reducing period, preferably, the atmospheric temperature of the solid reducing period is controlled to the range of from 1350 to 1450° C., and at a temperature of less than 1350° C., the speed of the solid reducing is slow so that the shell of metal iron is hard to form, failing to fully make use of the object of shortening the processing time. Further, when the solid reducing is carried out at a high temperature in excess of 1450° C., melting of iron oxide occurs at the time of solid reducing so that the shell of metal iron is hard to form, and the hearth refractory of the reducing furnace is materially damaged due to the increase of iron oxide leached out of the raw material compacting substance in the melting state, which poses a significant defect in carrying out the continuous operation. In consideration of this point, more preferable temperature of the solid reducing period is in the range of from 1380 to 1430° C., and preferably, for progressing the reduction in a shorter time, the temperature is rapidly elevated to not less than 800° C., more preferably, not less than 1000° C. within 2 minutes. When the solid reducing is carried out at a temperature elevated to a high temperature as described, the time required to enhance the reducing ratio to 30 to 80% can be shortened to about 3 to 5 minutes.

For further smoothly progressing the solid reducing, further thereafter reducing and carburizing and melting by the melting furnace, it is necessary to contain the surplus compounding amount of the carbonaceous reducing agent contained in the compacting substance with respect to the theoretic equivalent amount necessary for the reduction of iron oxide in the compacting substance and its carburizing during the course of manufacturing the raw material compacting substance. This is because, when the partially-reduced substance is charged into the melting furnace to carry out the final reducing and carburizing and melting, the additional charging of the carbonaceous reducing agent is omitted. Accordingly, the degree of the carbonaceous reducing agent to be compounded in surplus is that the amount necessary for the reduction of iron oxide in the compacting substance and its carburizing should be secured. The carburizing amount is normally 2 to 3.5%, but varies depending on the temperature condition and the atmospheric gas at the time of carburizng and melting. The carbonaceous reducing agent is also consumed by oxidative gas ($CO_2$ or $H_2O$) produced by burner heating at the time of reduction, and for securing the amount of carbon reducing agent necessary for the reduction of the residual iron oxide and carburizing of reduced iron in consideration thereof, the amount in surplus by not less than 3% with respect to the theoretic equivalent amount necessary for the reduction of iron oxide in the raw material compacting substance should preferably be compounded. However, excessive content results in waste from a viewpoint of economy, and preferably, the surplus amount should be suppressed to till 6%.

Further, for promptly elevating in temperature the raw material compacting substance at the time of solid reduction to progress the solid reducing, preferably, the compacting substance is suppressed to not more than 25 mm in conversion of diameter. When the size of the compacting substance becomes too large, the temperature elevating speed of the raw material compacting substance caused by the burner heating and radiant heat becomes slow, and the shortening effect of the solid reducing time intended by the present invention is possibly impaired. However, when the compacting substance is too small, it is difficult to form the shell of metal iron and the shell of network-like metal iron, there occurs a tendency that the progressing of rapid reduction due to the elevation of the internal reducing potential is impaired, and therefore, preferably, the size be adjusted to about not less than 3 mm in conversion of diameter. The use of expression "conversion in diameter" herein means that the compacting substance is not specified to a spherical shape but different shapes such as oval, egg-shape, short-rod shape (pellet-like), and a lump-shape, etc. will suffice. In short, if a raw material compacting substance having the size in conversion in diameter is used, it is possible to effectively exhibit formation of the shell of metal iron and the reducing speed enhancing effect caused by enhancement of the internal reducing potential caused thereby.

According to the present invention, the reducing ratio of the solid reducing period is limited to the range of from 30 to 80% to thereby progress the solid reducing most efficiently, then the partially-reduced substance obtained is charged into the melting furnace in a state of maintaining a high temperature to rapidly heat it, and the iron oxide remaining in the partially-reduced substance is further reduced and carburized rapidly by the action of the carbonaceous reducing agent to thereby enable manufacturing molten metal iron extremely efficiently in a short period of time.

In the following, the present invention will be described more concretely with reference to the drawing. Naturally, the present invention is not limited to the illustrations, but of course, a change is suitably made as necessary, which are included in the technical scope of the present invention.

Figure 2:
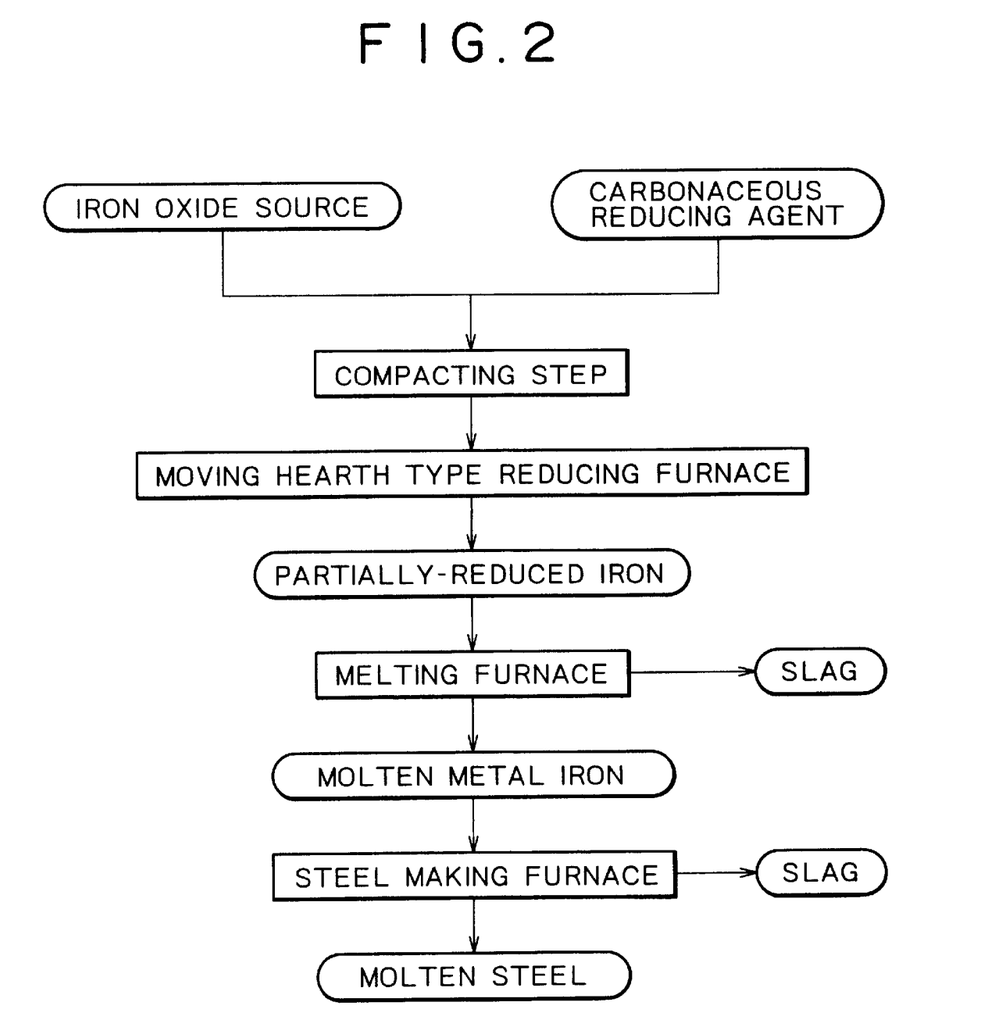
FIG. 2 is a flow chart illustrating the steps of the present invention.

FIG. 2 is a flow chart showing an example of manufacturing molten metal iron according to the present invention.

An iron oxide source (such as iron ore) and a carbonaceous reducing agent (such as coke, coal powder, etc.) are evenly mixed, and are blended with a binder such as bentonite and starch, as necessary, to manufacture a raw material compacting substance. In manufacturing the raw material compacting substance, as described above, the carbonaceous reducing agent in surplus amount of 3 to 6% with respect to the theoretic equivalent amount necessary for reducing iron oxide with is compounded respect to the iron oxide source in the raw material, and the compact size thereof is adjusted to the range of from 3 to 25 mm in conversion of diameter, more preferably, to the range of from 6 to 20 mm. Most generally, the shape of the compacting substance is approximately spherical, but shapes such as an oval shape, an egg shape, and a short-rod shape may be suitably employed. A pellet-like, a briquette-like or a lump-like shape will also suffice. In manufacturing the raw material compacting substance, a suitable amount of lime stone or calcium hydroxide having desulfurzing function may be contained.

The obtained raw material compacting substance is charged into the moving hearth type reducing furnace, and the solid reducing is progressed by heating it on the hearth. The solid reducing is progressed by elevating a temperature to, preferably, not less than 800° C., within 2 minutes, more preferably, not less than 1000° C., and heating at an atmospheric temperature of 1300 to 1450° C. By employment of such temperature conditions, the raw material compacting substance is progressed to be reduced from the surface to form a shell of metal iron on the surface, or form a state that metal iron is stretched around in a network fashion (see FIG. 6 described later), and a high reducing potential atmosphere is formed within the shell of metal iron or within the network construction whereby the reducing is progressed therein rapidly. However, in the present invention, the reducing ratio is limited to the range of 30 to 80% in the solid reducing step and the reducing is progressed efficiently to obtain partially-reduced iron. In that time, the time required is very short, and the solid reducing is terminated in about 3 to 5 minutes.

The partially-reduced iron obtained is formed with a shell of metal iron on the surface thereof, or with a shell in which metal iron is stretched around in a network fashion (see FIG. 6), which contains therein iron oxide in a non-reduced state, an unreacted carbonaceous reducing agent and produced slag, the temperature is in a high temperature state of 1350 to 1450° C., and the partially-reduced iron is charged into the melting furnace in the high temperature state. Melting furnaces used include, for example, an arc heating type melting furnace and an iron bath furnace (including a converter), and since molten metal iron at high temperature obtained in the previous charging is stored therein (only in the first time, heating and melting of partially-reduced iron is carried out by arc heating or the like), reducing of residual iron oxide is progressed promptly by heat of molten metal iron within the melting furnace and the produced metal iron receives carburizing by the carbonaceous reducing agent which is present in surplus, and is molten promptly to merge with molten metal iron in the melting furnace. The slag produced at that time floats on the surface of the melting furnace, and can be discharged from the surface by suitable means.

The obtained molten metal iron is stayed in the melting furnace or transferred once to a refining furnace to apply processes such as decarbonizing, desulfurizing, dephosphorizing, etc. thereto to obtain molten steel, or a suitable amount of alloy element is further added thereto to manufacture alloy molten steel.

That is, according to the present invention, reducing is stopped in the range of 30 to 60% of the reducing ratio at which highest reducing speed in the solid reducing period is obtained, and the partially-reduced iron generated is fed to the melting furnace in the high temperature state to receive further reducing and carburizing, melting. The holding heat of the partially-reduced iron can be used effectively as it is, and the partially-reduced iron is heated promptly by the high temperature molten metal iron stayed in the melting furnace to effect final reducing and carburizing and melting, thus materially shortening the processing time as a whole. Moreover, the time required for solid reducing is within 10 minutes even if the temperature elevating time is added as described above, and the thereafter final reducing and carburizing and melting by the melting furnace will be also finished in a short period of time, within 10 minute, thus being able to maintaining the balance of time and thermal energy between both the steps, and being able to materially simplify a series of step managements. Further, with respect to the production speed, it can be suitably adjusted by designing the capacity of the meting furnace according to a scale of the solid reducing furnace.

Figure 3:
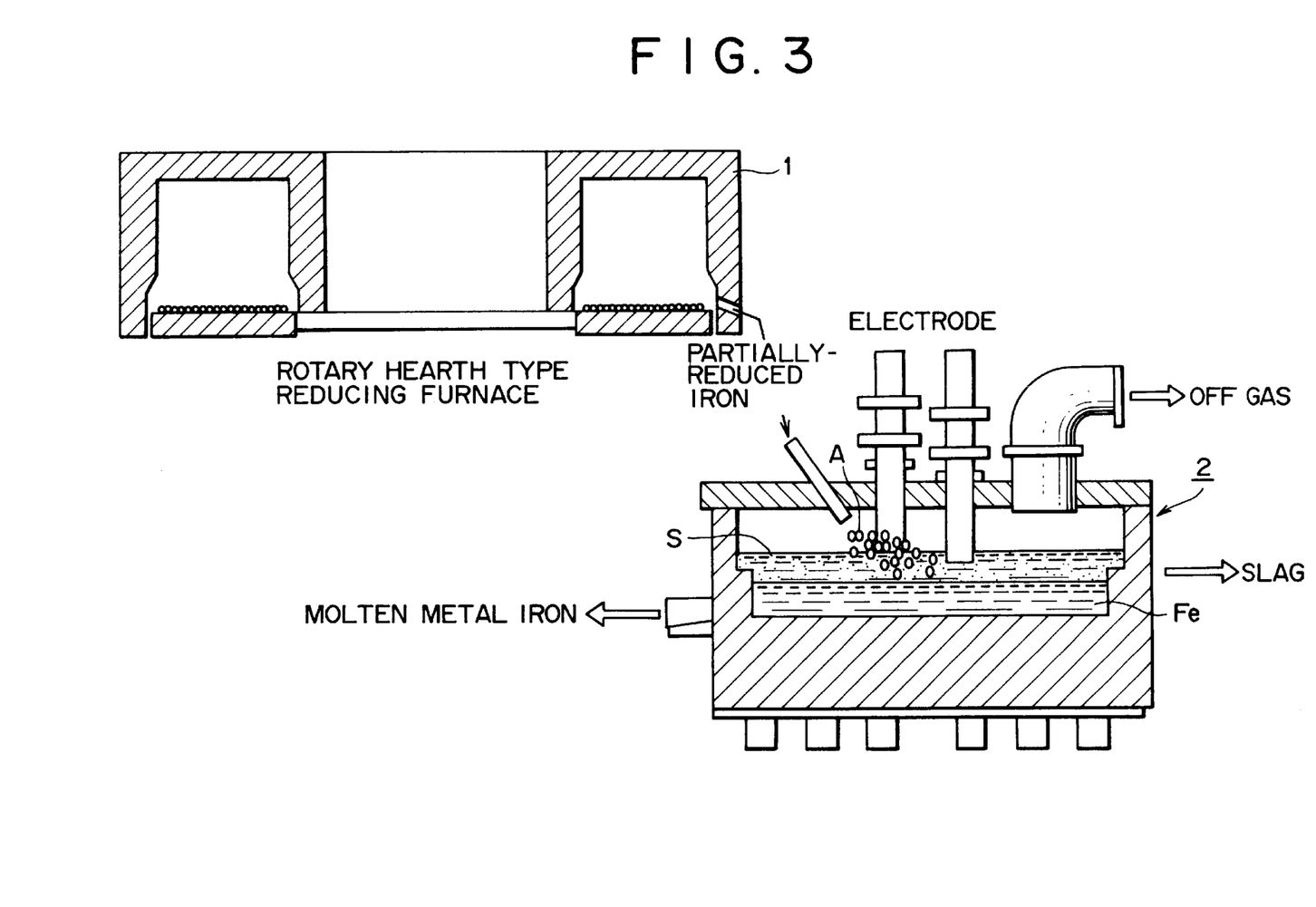
FIG. 3 is a schematic sectional explanatory view illustrating a moving hearth reducing furnace and melting furnace of the present invention.

FIG. 3 is a schematic sectional explanatory view illustrating equipment provided with a reducing furnace and a melting furnace to which is applied the present invention. A rotary hearth type reducing furnace 1 is used as a moving hearth type reducing furnace, an arc heating type melting furnace 2 is provided adjacent to the installing position of the furnace 1, and high temperature partially-reduced iron A manufactured continuously in the reducing furnace 1 is supplied immediately to the arc heating type melting furnace 2 to receive further reducing and carburizing and melting. Molten iron Fe produced and slag produced may be taken out of the melting furnace 2 continuously or periodically.

Figure 4:
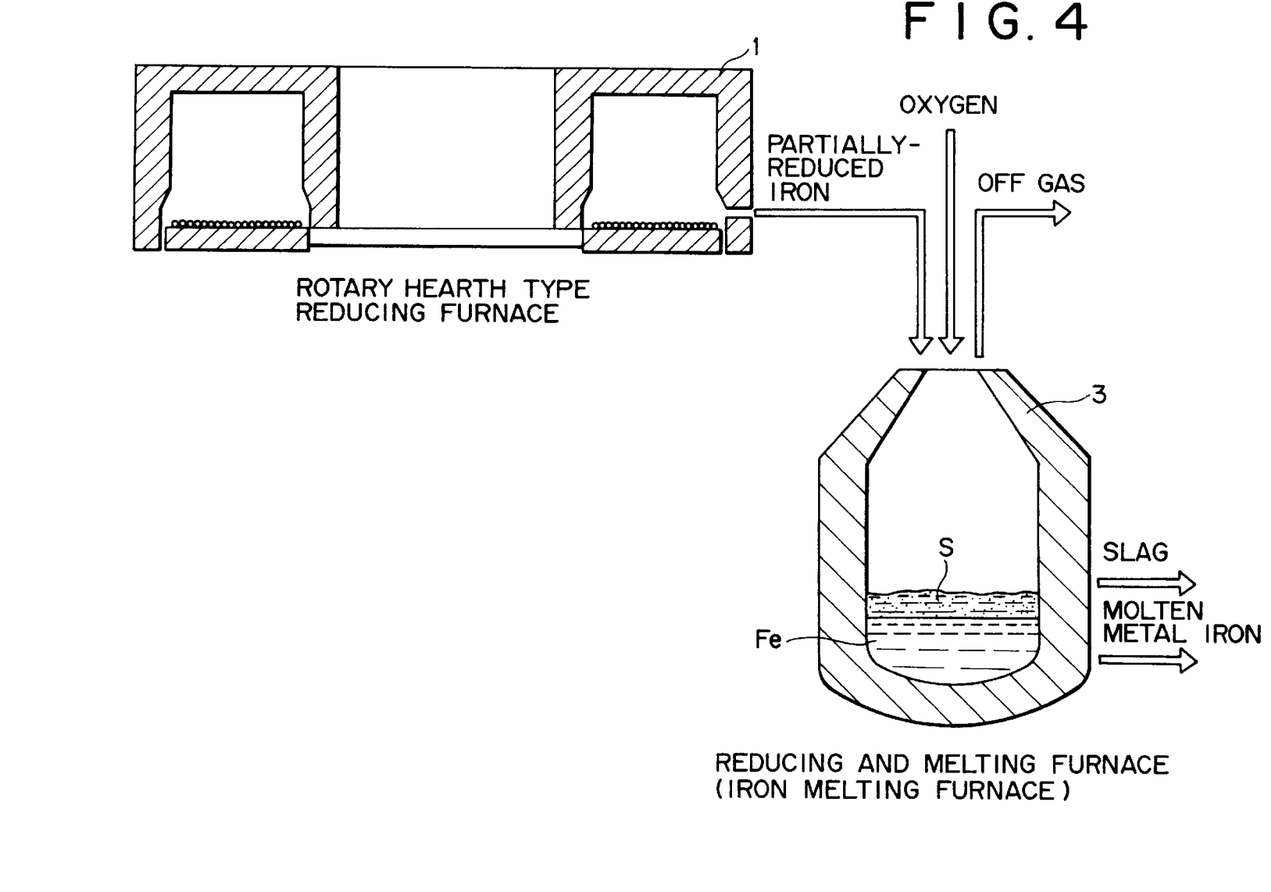
FIG. 4 is a schematic sectional explanatory view illustrating another moving hearth reducing furnace and melting furnace of the present invention.

FIG. 4 is a schematic sectional explanatory view showing still another example to which the present invention is applied. A rotary hearth type reducing furnace 1 similar to that mentioned above is used as a moving hearth type reducing agent, an iron bath furnace (converter) is provided adjacent to the installing opposition of the furnace 1, high temperature partially-reduced iron produced continuously in the reducing furnace 1 is supplied immediately to the iron bath furnace 3 to receive further reducing and carburizing and melting, oxygen (or air) is blown by a top blowing lance or a bottom tuyere to effect decarbonizing refining to obtain molten metal iron, and separation of produced slag floating on the surface is carried out. Where contents of S, P, Si, etc. contained in the partially-reduced iron are too much, desulphurizing, dephosphering, and desilicating are carried out to effect blowing, and thereafter, a suitable amount of alloy element is added as necessary to obtain alloy steel.

Figure 5:
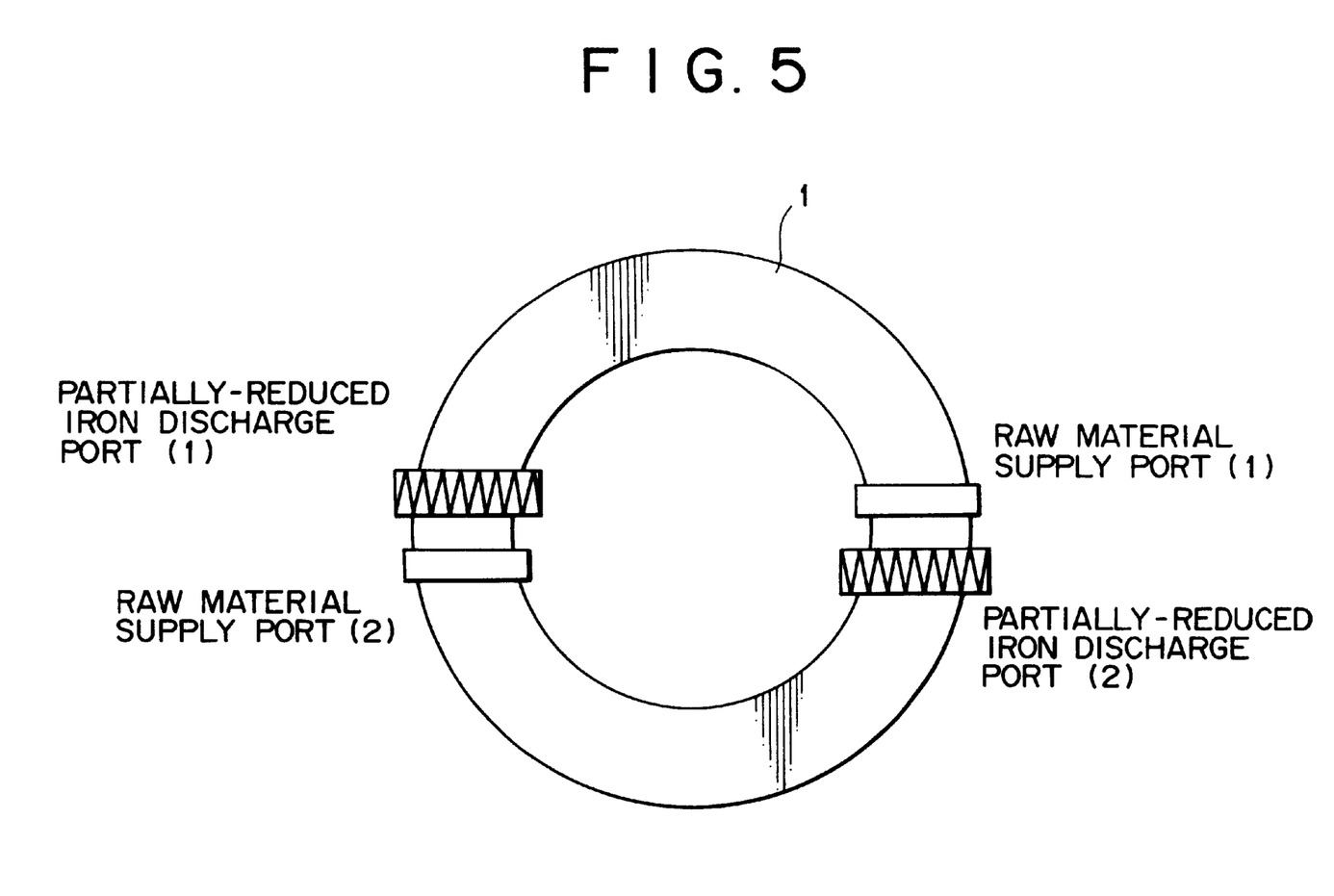
FIG. 5 is a schematic plan view illustrating anther rotary hearth reducing furnace of the present invention.

As the moving hearth type reducing furnace used in the present invention, any reducing furnace such as a rotary hearth type, a straight grate type or the like may be used as long as those having a function capable of continuously heating the raw material compacting substance by a burner heating or the like on the hearth which moves continuously. Further, while in the above illustration, an example is shown in which the partially-reduced substance is taken out of one place of the rotary hearth type reducing furnace and supplied to the melting furnace, it is noted that for example, as shown in FIG. 5, the partially-reduced substance can be taken out of plural places (two places in the illustration) of the rotary hearth type reducing furnace and supplied into the melting furnace. Also, any melting furnace may be used as long as they have the construction in which metal iron can be heated and molten, and an arc heating type furnace and an iron bath furnace (including a converter) may be used.

The present invention being constituted as described above, the reducing ratio by the solid reducing using the moving hearth type reducing furnace is limited to the range of 30 to 80%, and the partially-reduced substance obtained is fed to the melting furnace in the state of maintaining the high temperature, and the final reducing and carburizing and melting are carried out to suppress the molten loss of refractories of the reducing furnace and the meting furnace as less as possible to produce molten metal iron efficiently in a short period of time. Further, in the present invention, the time required for obtaining the partially-reduced substance by the solid reducing is not much different from the time required for charging the partially-reduced substance to the melting furnace to effect further reducing and carburizing and melting but the time and energy balance can be well maintained between both the steps, thus capable of effectively using the high temperature partially-reduced substance as a heating source for the melting furnace and capable of suppressing the consuming energy as a whole of equipment to the minimum limit as well.

We claim:

1. A process for manufacturing molten metal iron, comprising; compacting a raw material compacting substance containing a carbonaceous reducing agent and an iron oxide contained substance; charging said raw material compacting substance into a moving hearth reducing furnace to reduce said raw material compacting substance to a reducing ratio of 30 to 80% within said reducing furnace to thereby form slag, and a) a shell formed of metal iron or b) a state that a shell formed of metal iron is stretched around in a network fashion and said carbonaceous reducing agent remains in a clearance therebetween; agglomerating produced slag containing FeO therein; charging said compacting substance reduced into a melting furnace in a state maintaining a high temperature; and carrying out final reducing and melting.

2. The process according to claim 1, wherein said raw material compacting substance is compacted with a carbonaceous reducing agent surplus by 3 to 6 mass % with respect to a theoretic equivalent amount necessary for reducing iron oxide contained in said compacting substance contained therein.

3. The process according to claim 1, wherein said melting furnace is an arc heating melting furnace or an iron bath furnace, iron oxide remained in said raw material compacting substance is reduced, and reduced iron is carburized by the carbonaceous reducing agent to melt the former.

4. The process according to claim 1, wherein an internal temperature of said reducing furnace when reducing takes place is in the range of 1350 to 1450° C.

5. The process according to claim 1, wherein reduction of the raw material compacting substance in said reducing furnace is carried out for 3 to 5 minutes.

6. The process according to claim 1, wherein said raw material compacting substance is compacted into a pellet or briquette having a diameter of 3 to 25 mm.

7. The process according to claim 1, wherein the raw material compacting substance charged into said reducing furnace is elevated to a temperature of not less than 800° C. within 2 minutes.

8. A process for manufacturing molten metal iron, comprising;

charging a raw material compacting substance containing a carbonaceous reducing agent and an iron oxide contained substance into a moving hearth reducing furnace; reducing said raw material compacting substance to a reducing ratio of 30 to 80% within said reducing furnace to thereby form slag, and a) a shell formed of metal iron or b) a state that a shell formed of metal iron is stretched around in a network fashion and said carbonaceous reducing agent remains in a clearance therebetween; agglomerating produced slag containing FeO therein; charging said compacting substance reduced into a melting furnace in a state maintaining a high temperature; and carrying out final reducing and melting.

* * * * *